(12) United States Patent
Uecker

(10) Patent No.: US 8,746,536 B2
(45) Date of Patent: Jun. 10, 2014

(54) WELD STRESS COMPENSATION SYSTEM

(71) Applicant: Timothy M. Uecker, Port Townsend, WA (US)

(72) Inventor: Timothy M. Uecker, Port Townsend, WA (US)

(73) Assignee: Meridian Stainless, Inc., Port Townsend, WA (US)

( * ) Notice: Subject to any disclaimer, the term of this patent is extended or adjusted under 35 U.S.C. 154(b) by 0 days.

(21) Appl. No.: 13/891,038

(22) Filed: May 9, 2013

(65) Prior Publication Data

US 2013/0299563 A1    Nov. 14, 2013

Related U.S. Application Data

(60) Provisional application No. 61/646,445, filed on May 14, 2012.

(51) Int. Cl.
    *B23K 37/04*    (2006.01)
(52) U.S. Cl.
    USPC ........................................ 228/44.5; 228/49.3
(58) Field of Classification Search
    None
    See application file for complete search history.

(56) References Cited

U.S. PATENT DOCUMENTS

| | | | | | |
|---|---|---|---|---|---|
| 455,414 | A | * | 7/1891 | Searle | 269/246 |
| 2,387,154 | A | * | 10/1945 | Kalwitz | 29/879 |
| 2,802,440 | A | * | 8/1957 | Willis | 269/165 |
| 3,878,951 | A | * | 4/1975 | Wagner | 414/680 |
| 3,944,202 | A | * | 3/1976 | Dearman | 269/130 |
| 5,052,608 | A | * | 10/1991 | McClure | 228/44.5 |
| 5,445,309 | A | * | 8/1995 | Yamada et al. | 228/170 |
| 8,397,975 | B1 | * | 3/2013 | Franco | 228/44.5 |
| 2002/0066774 | A1 | * | 6/2002 | Prochac | 228/212 |
| 2005/0028337 | A1 | * | 2/2005 | Bota | 29/33 R |
| 2007/0245872 | A1 | * | 10/2007 | Kelly | 83/581 |
| 2008/0296353 | A1 | * | 12/2008 | Simmons | 228/176 |
| 2011/0031298 | A1 | * | 2/2011 | Simmons | 228/102 |
| 2012/0279949 | A1 | * | 11/2012 | Simmons | 219/159 |

OTHER PUBLICATIONS

MSC Industrial Supply Co., 2012/2013 catalog, cover page, pp. 1273-1275, online at mscdirect.com.
Aircraft Spruce & Specialty Co., 2012/2013 catalog, cover page, catalog page, quick index page, pp. 703, 716, 727, online at www.aircraft-spruce.com.
Strong Hand Tools, 2013 catalog, cover page, p. 26, online at stronghandtools.com.
VanSant Enterprises, Inc., Trick Tools 2013 catalog, cover page, index page, pp. 28-29, 34-37, catalog back page, online at TrickTools.com.

* cited by examiner

*Primary Examiner* — Kiley Stoner
(74) *Attorney, Agent, or Firm* — Innovation Law Group, Ltd.; Jacques M. Dulin, Esq.

(57) ABSTRACT

Weld stress compensation system and method comprising: 1) a primary tube/rod clamp; 2) a secondary tube/rod clamp for selectively and accurately, angularly positioning the secondary tube relative to the primary tube. The secondary clamp is transferable while a secondary tube/rod is clamped therein to: 3) a saddle cutting fixture to produce a concave, relieved portion in the end of the secondary tube/rod with flanking flanges that fit precisely over the primary tube at the join intersection; 4) a miter-cut fixture for miter cutting of tube/rod ends to fit flat surfaces or conversely-cut tubes/rods for angular joins; and 5) a welding fixture for precise angular positioning of a miter cut tube/rod to a deck, wall, or stair plate. The primary clamp includes an adjustable pressure pad that applies pressure to the side of the primary tube opposite the secondary tube weld join line thereby preventing warping due to weld stresses.

14 Claims, 10 Drawing Sheets

WELD STRESS COMPENSATION SYSTEM

CROSS-REFERENCE TO RELATED CASE

This is the US Regular application corresponding to its priority documents, Provisional Application Ser. No. 61/646,445, filed May 14, 2012 by the same inventor under the same title, the date of which is claimed for priority under 35 USC §120 ff.

FIELD

This invention relates to a weld stress compensation system and more particularly an apparatus and method for compensation of stress and warping in tubular and rod members generated during welding of such members to each other. The inventive system is implemented in a multi-part fixture assembly for accurately cutting tubular parts and for holding the parts in proper angular position during welding so that the tubes do not become warped, deformed or skewed. The inventive system is particularly useful for welding of stainless steel or aluminum tubing used in marine applications, such as railings, stanchions, platforms, ladders, stairways and other fittings.

BACKGROUND

Welding of round tubular parts to each other is particularly difficult as at least one of the tubes must be cut in a compound, 3-dimensional curve in order to engage a second round tube for welding. For example, when welding two round tubes to each other, at least the secondary tube must have a saddle cut at its end which is to be joined to the outer wall of the primary tube. Where the saddle cut is not sufficiently precise, a gap is presented at the join position which is, at best, difficult to fill properly in order to make a sound, strong weld. A similar problem exists where a round tube must be welded to a flat surface at an angle, requiring a precise miter cut.

This problem is compounded by the fact that at the point of welding join of the two tubes, the primary tube will bend due to the stresses produced during welding. This bend not only results in the included join angle between the two tubes being incorrect, but also an unsightly bow is produced in the primary tube. Thus, taking for example a safety rail mounted on the deck of a boat adjacent the gunwale, the stanchions amidship are oriented normal to the horizontal railing and angled at the bow pulpit section and at the stern transom areas. In some cases the amount of warping of the horizontal rail occurring at every join of the stanchions is sufficient to present an objectionable wavy appearance.

The current practice of positioning of the parts with blocks in preparation for welding them together fails to provide any warp-compensation. The result is a slow process of repeated steps of partial welding followed by cooling so that the deformation is minimized. However, this process is inherently inaccurate due to the various sizes of tubing used. The result is experience-based guesswork that often results in do-overs and wasted material. Where the horizontal rail run is long, to have even only the last stanchion weld position warp, often results in rejecting the entire rail. This results in requiring remaking the entire rail, a substantial waste of time and material, and results in a substantial, two or three-fold increase of the rail assembly expense.

In addition, the welding of long rails having vertical and angular spindles that follow the contour of the gunwale is ordinarily a two or more person job, in that one person has to hold the rail and spindle members in proper angular position, and the other welds the rail to the spindle. This makes the assembly highly labor intensive; the work proceeds slowly, one spindle at a time.

Accordingly, there is an unmet need in the art for an improved round tubular work piece fixture system that compensates for welding-induced stress, accurately positions two (or more) tubes with respect to each other for welding, includes a way to accurately make saddle and miter cuts at the proper angle for joining the tubes, and permits setting up an entire rail assembly before welding to reduce labor costs, which fixture system is robust, simple to use, shortens construction time while reducing labor costs and reject fabrication loss.

THE INVENTION

Summary, Including Objects and Advantages

The inventive weld stress compensation system and method comprises: 1) a primary tube or rod clamping assembly; 2) a secondary tube or rod clamp assembly having means for selectively, adjustably positioning the secondary tube relative to the primary tube, and which includes means for quick securement and removal of the secondary clamp from or to the primary clamp assembly; 3) a saddle-cut fixture assembly to which the secondary tube assembly may be secured for tube end cutting into the proper angle saddle cut. The saddle cut, also called "coping" or "notching" produces a concave, relieved portion in the end of the secondary tube or rod with flanking flanges that fit snugly over the primary tube at the join intersection. For each different join angle, the saddle cut is uniquely different, so it must be precise for proper fit in order to be properly welded.

With respect to the method of reduction of welding stress, the process comprises the steps of: A) securely clamping a primary tube in the primary clamp assembly; B) mounting the secondary tube clamp assembly onto the primary clamp; C) clamping a secondary tube in the secondary clamp assembly; D) selectively adjusting the angle of intersection of the secondary tube with respect to the primary tube; E) clamping the intersection angle in the secondary clamp assembly; F) transferring the secondary clamp assembly having the secondary tube clamped at the intersection angle, to a saddle cutting fixture; G) precisely cutting an end of the secondary tube in the proper a saddle shape for the selected intersection angle; H) removing the secondary clamp assembly from the cutting fixture; I) re-mounting the secondary clamp assembly to the primary clamp assembly with the properly saddle-cut secondary tube contacting the primary tube at the selected intersecting angle; and J) welding the secondary tube to the primary tube.

The primary clamp includes a pressure pad that will maintain sufficient force on the primary tube at a point substantially opposite the point of intersection to prevent warping of the primary tube during welding. The pressure pad is mounted in a carrier to the clamp spindle via a ball-in-socket fitting that permits swiveling to adjust for primary tube curvature, as needed. In addition, while the secondary clamp is secured to the cutting fixture, any number of secondary tubes may be inserted sequentially, one after the other, for the proper saddle cut in each. That is, the intersection angle is set for a plurality of secondary tubes, and each of the secondary tubes in turn are inserted, clamped, cut, and removed from the secondary clamp while it is in the cutting fixture. Thus, if the proper angle of intersection is, say, 60° and a plurality of secondary tubes are all to be cut to that angle of intersection, once the secondary clamp assembly is set-up in the cutting fixture, all the secondary tubes may be cut, one at a time. Thereafter, they can be welded to the primary tube at the same angle at which they were cut, as needed along the primary tube(s).

The secondary clamp assembly is also use with a miter cutting fixture to provide a precise straight end cut using a power reciprocating saw, the blade of which is guided linearly by a combination of spring-biased blade guides and a shoe guide that receives a shoe fitting of the reciprocating saw.

Still further, the secondary clamp assembly may transfer the miter-cut secondary tube in a fixed angular position to a welding jig for welding to a base plate on a deck, wall, stair tread or the like. The welding jig includes an apertured base plate, optionally having angularly and vertically adjustable feet for precise positioning of the mitered tube prior to and during welding.

While an exemplary implementation of the system and method is disclosed by reference to the marine industry field, and particularly to fabrication of complex stainless steel tubular fittings for sail and power boats, one skilled in this art of welding fabrication will recognize the inventive system and method are applicable to a wide range of fields and products in a straight-forward manner, including the construction and vehicle industries in general and building railings, ladders, stairs and racks in particular.

Thus, where the secondary tubes are the spindles for a boat railing, and all have defined lengths, they may all be pre-cut using the inventive secondary clamp and saddle cut fixtures following the method described above. Then a plurality of the inventive primary and secondary clamps may be employed to clamp all the spindles in proper orientation for a continuous rail member, after which they are then welded. This permits division of labor in that a first worker can do the secondary tube saddle cutting and setting up the entire rail with the plurality of fixtures spaced along it, and a second worker, a professional stainless steel welder, moves continuously along welding one spindle after another while each is secured in place by the inventive primary and secondary clamp assembly. This permits complete set-up of the entire rail from stem to stern so the angle and spacing of the spindles can be checked for accurate placement before welding. The welder does only the welding; the assistant does the stock cutting and set-up.

The saddle cutting fixture includes a housing having an opening in a first side wall, e.g., an upper wall, through which the secondary tube projects. The length and angle that the secondary tube projects into the housing is adjusted by the secondary clamp assembly. A tubular saw is attached to a powered shaft and inserted through a tubular aperture in an end wall of the saddle cutting fixture with the axial center-line of the saw intersecting the center line and end of the secondary tube projecting into the housing. The tubular saw is rotationally powered to cut the secondary tube end into the required saddle shape. For primary tubes of various sizes, the saddle cutting fixture employs centering pads and/or sleeves, and a tubular saw diameter that match the diameter of the primary tube is selected and employed to make the cut. The shaft rides in a bearing sleeve within the cutting fixture housing to precisely guide the tubular saw for cutting. The housing is configured to be retained in a stand, on a base or in a vice. The housing preferably employs aligned elongated slots in opposed second and third side walls to permit a flat blade saw to be used for miter angle cutting of a secondary tube end, e.g., the end opposite the saddle cut, for precise angular fitting of the secondary tube to a deck plate. The housing optionally includes a semi-circular stop member that is positioned just above the saddle cut zone to assist in preventing flexure of the end of the secondary tube during saddle or miter cutting.

While the pressure pad of the primary clamp is shown in the exemplary implementations as a straight semi-circular section, it should be understood that curved pressure pads may be employed where the primary tube member is curved at the point of join with a secondary tube. Likewise, the split clamp blocks of the secondary clamp assembly may be appropriately contoured to permit retaining a curved secondary tube in proper angular orientation. Accordingly, the clamps of the inventive weld stress compensation system permit precise weld joining of complex, compound curved tubing elements.

As shown herein the pressure pad and split clamp assemblies are made of metal, preferably aluminum, to act as thermal sinks to assist in controlling warping due to the heat generated during welding. The metal to metal contact of pressure pad to the primary tube provides for good thermal conduction away from the welding area during construction.

Accordingly, the ability to mock-up an entire railing using multiple linked, primary/secondary clamp assemblies, the good thermal sink properties of the pressure pads and blocks, and the use of curved pads and blocks as needed, permits faster and more precise welding of multiple-join complex and compound-curve tubular fabrications, particularly TIG welding of stainless steel tubes and rods.

BRIEF DESCRIPTION OF THE DRAWINGS

The invention is described in more detail with reference to the drawings, in which:

FIGS. 4A and 4B are a pair of related figures showing the set up for making an accurate saddle cut in the secondary tube, in which FIG. 4A is a side elevation view of the saddle and miter cutting fixture assembly with the internal parts thereof aligned above the housing, and FIG. 4B is a side elevation view showing the secondary clamp now removably secured in position to the saddle/miter cutting fixture housing, with the secondary tube slid into position, ready for cutting with the semi-circular stop in position to support the end of the tube;

DETAILED DESCRIPTION, INCLUDING MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be exemplary modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
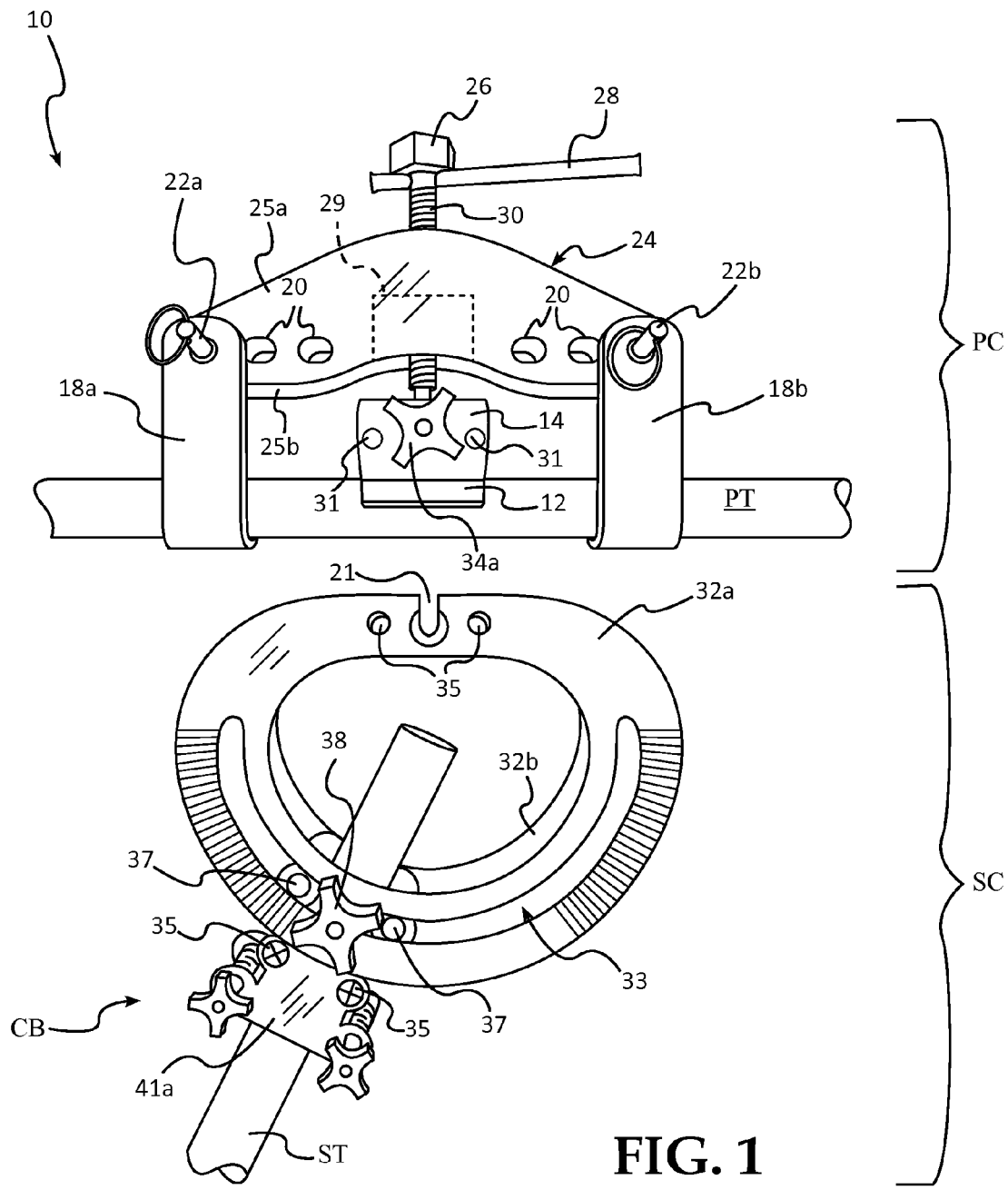
FIG. 1 is a plan view of the primary and secondary clamp assemblies in their assembled configurations in which a primary tube is clamped in position in the primary clamp, and a secondary tube is clamped in the secondary clamp, but the two clamps are not yet connected.
Figure 2A:
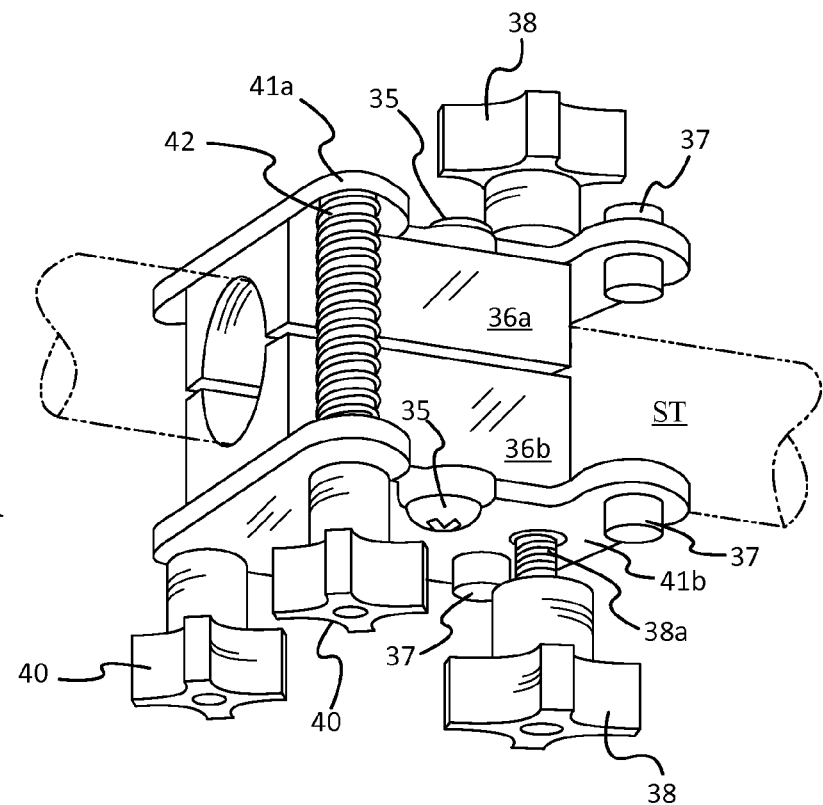
FIG. 2A is an isometric view of the secondary tube split clamp assembly, the secondary tube being shown in phantom.
Figure 2B:
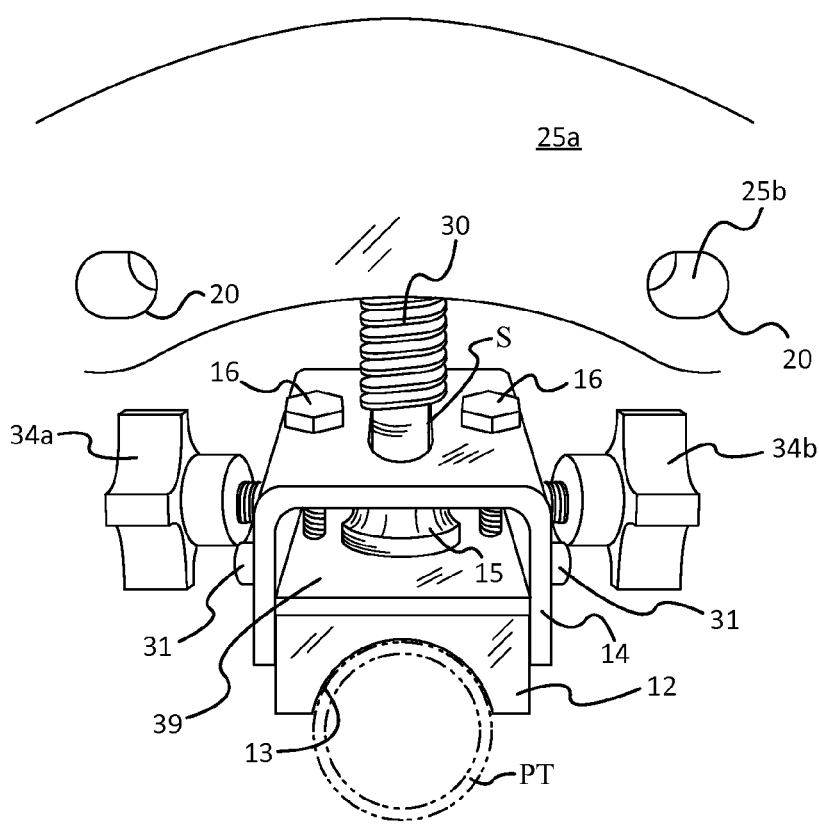
FIG. 2B is an isometric view of the primary tube carrier for providing pressure on the primary tube at the weld position, the primary tube being shown in phantom.

Referring to FIGS. 1, 2A and 2B, the inventive fixture system comprises Primary tube Clamp assembly PC and Secondary tube Clamp assembly SC, which are configured to cooperatingly inter-engage for operation. The Primary tube Clamp PC comprises a pressure pad 12, having a contoured bottom face 13 (best seen in FIG. 2B) for snugly receiving a primary tube or rod PT, inserted into U-channel-shaped carrier 14 and retained by retaining screws 16 (best seen in FIG. 2B). Spaced-apart slings 18a and 18b are placed around the primary tube or rod PT. The contour of the pressure pad 12 and of the slings 18a, 18b match the primary tube or rod; where the tube or rod is round in cross-section, the pad and sling contour is semi-circular, but where the tube or rod is square, the pad and sling contours matingly conform to the corresponding shape. Reference herein to a "tube" also includes a rod, and they may be round, square, rectangular, oval, hexagonal or octagonal in cross-section.

Each sling 18 is secured by pins 22a and 22b into the frame assembly 24, which comprises a pair of plates 25a, 25b spaced apart by a bridge piece 29 that is internally threaded to receive spindle 30. The pressure pad 12 is tightened against the primary tube PT by advancing threaded spindle 30, either by rotatingly turning handle 28 or by wrench applied to hex-head spindle end 26. The primary tube is securely retained between the two slings 18 spaced on either side of the opposing central pressure pad 12. Tightening hex head 26 or handle 28 firmly locks the primary tube clamp PC onto the primary tube PT. Note the extra slots 21 in the plates 25a, 25b are provided to permit positioning the slings 18 closer to the pressure pad 12, as needed, for example where a secondary tube ST may be required to be positioned adjacent an end of the primary tube PT. The slots 20 also allow slings 18 to align to the curvature of the primary tube PT, if any.

The lower half of FIG. 1 and FIG. 2A shows the Secondary tube Clamp assembly SC, comprising a pair of arcuately-shaped, slotted guide plates 32a, 32b, within which a clamp block assembly, CB, can slide in arcuate slots 33. The clamp block CB includes a pair of spaced clamp block retainers 41, between which are retained two half-blocks 36a, 36b. The half blocks 36a, 36b are secured to their respective clamp block retainer plates 41a, 41b by screws 35 and placed around the secondary tube or rod ST; the biasing springs 42 maintain the blocks slightly separated so the tube can be slid in the block to the desired position. To retain the secondary tube ST, the knobs of clamping screws 40 are tightened down against the biasing spring force 42.

With the locking knobs 38 removed from the clamp block CB, the arcuate slots 33 of guide rails 32a and 32b are fitted over clamp block protruding pins 37, one guide plate on each side of the clamp block assembly CB. By use of the angle markings on the guide plate 32a or 32b (as shown in FIG. 1), the secondary tube ST is positioned at the desired angle and secured in proper angular position (as called for by the design plans) by tightening the locking knobs 38, the shank of each knob 38a, 38b fitting snugly but slidably in the arcuate slot 33 of each guide plate 32a, 32b, respectively. Optionally, the shank 38a may be a threaded stud welded to the face of its respective clamp retainer plate 41a, 41b.

Figure 3:
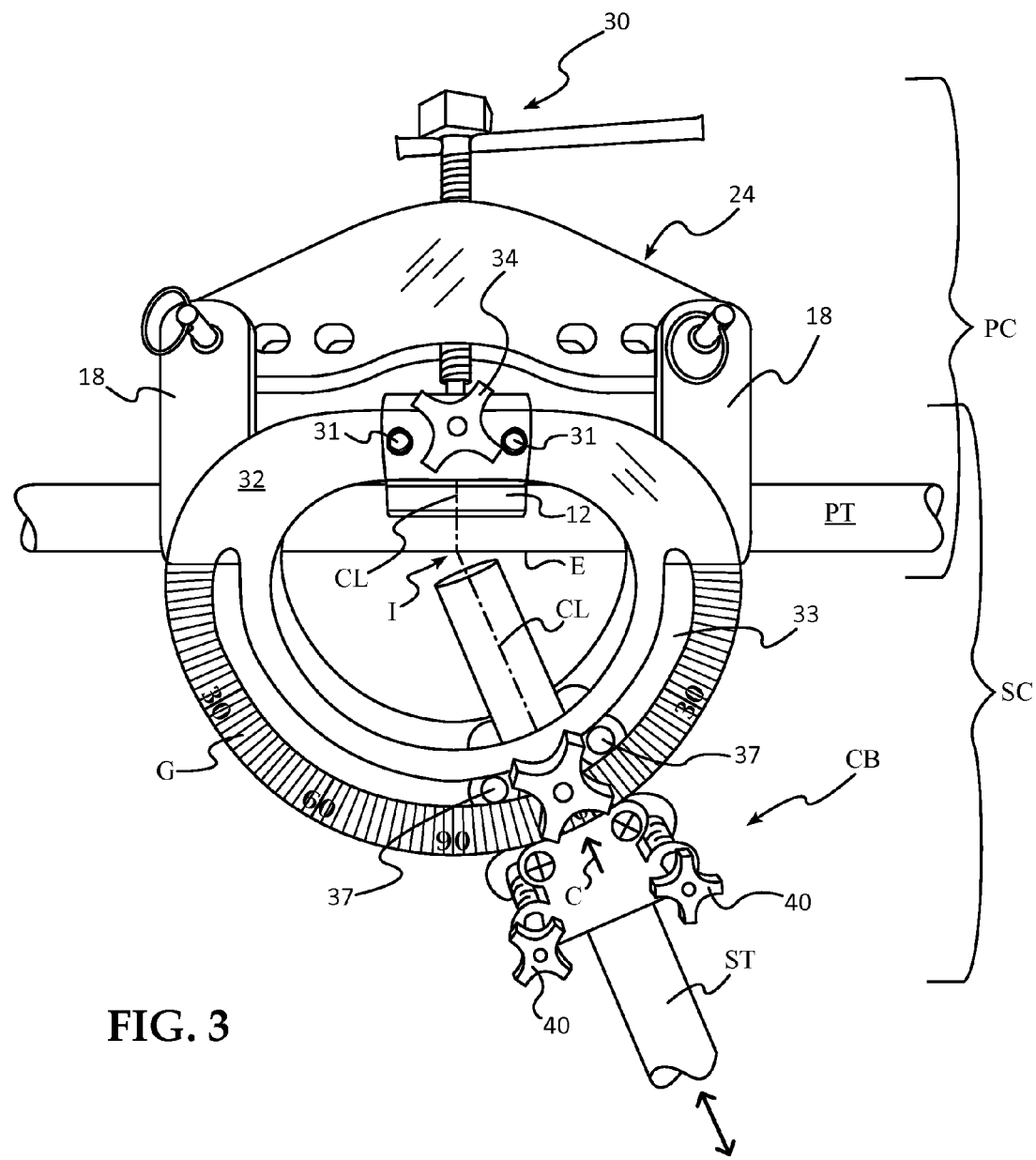
FIG. 3 is an enlarged close-up view of the setting of the intersection angle of the primary and secondary tubes as clamped in their respective clamp assemblies when the two clamping assemblies are assembled and fastened together into the single weld stress compensation fixture.

The result is that the arcuate guide plates are spaced apart sufficiently by the clamp block assembly CB to slip over the opposed sides of carrier 14, so that the holes 35 in each guide plate receive the aligned pins 31 on the carrier 14. Then the thumbscrews 34 on each side are tightened to secure the two clamp sub-assemblies together as shown in FIG. 3. The holes 35 in the guide plates 32a, 32b match the outer pins 31 on the carrier 14 and a notch 21 in each guide plate 32 receives the shank of the respective thumb screws 34a, 34b. Note also in FIG. 2B that the unthreaded terminal shank portion of spindle 30 passes through slot S in the top horizontal face of the carrier (U-shaped in cross-section) and the standard ball end in a standard swivel socket 15 that is welded to a recessed plate 39 in the carrier 14 to permit the pressure pad to self-center in the case of a curved primary tube section, PT.

As best seen in FIGS. 2A and 3, the primary and secondary clamp assemblies are now joined by the thumbscrews 34 at the carrier 14. When the clamping screws 40 are released, the halves of the clamp block 36a, 36b are biased apart by the springs 42 so that the secondary tube ST may be slid inward toward the primary tube PT until it intersectingly contacts the primary tube PT. The centerlines CL of both the secondary tube ST and the spindle 30 intersect at point I on the edge E of the primary tube PT as shown. The centerline of the secondary tube ST coincides with the cursor C which is scribed on the face of each clamp retainer plate 41. The cursor line C permits setting the angle by reference to the angle gradations G clearly shown on the face of each of the concentric guide plate ribs.

When at the correct angle, the secondary tube is slid forward in the clamping blocks 36 until it contacts the primary tube PT. The clamping screws 40 are tightened to clamp the secondary tube into the advanced position. The Secondary tube Clamp SC is now set to the desired intersecting angle for the end saddle cut.

Figure 4A:
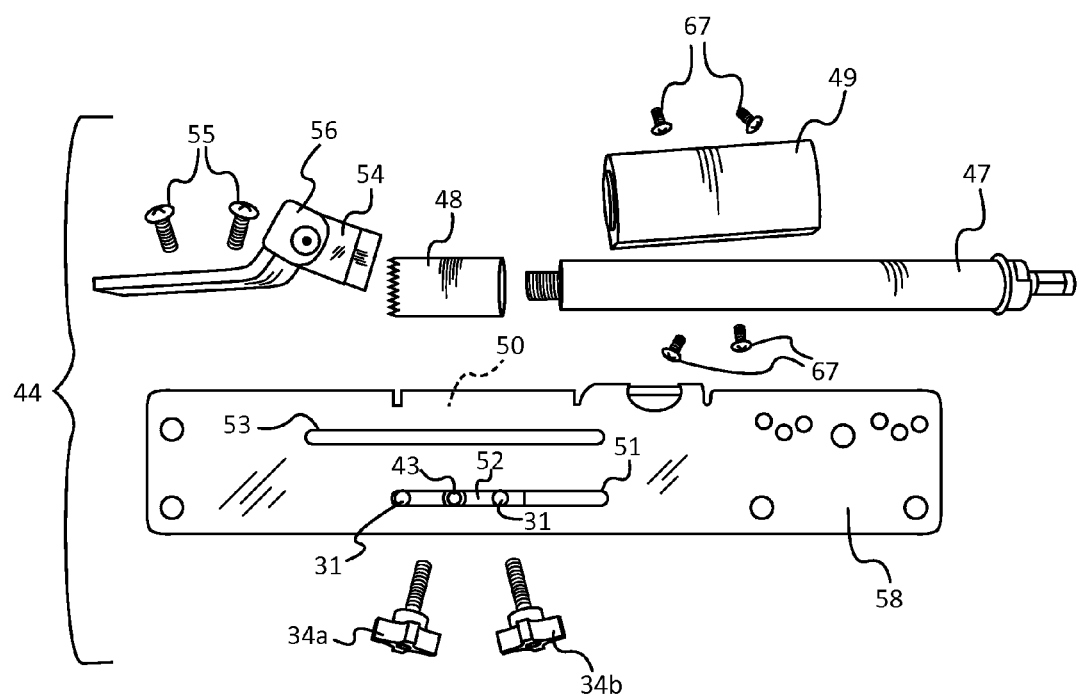
Figure 4B:
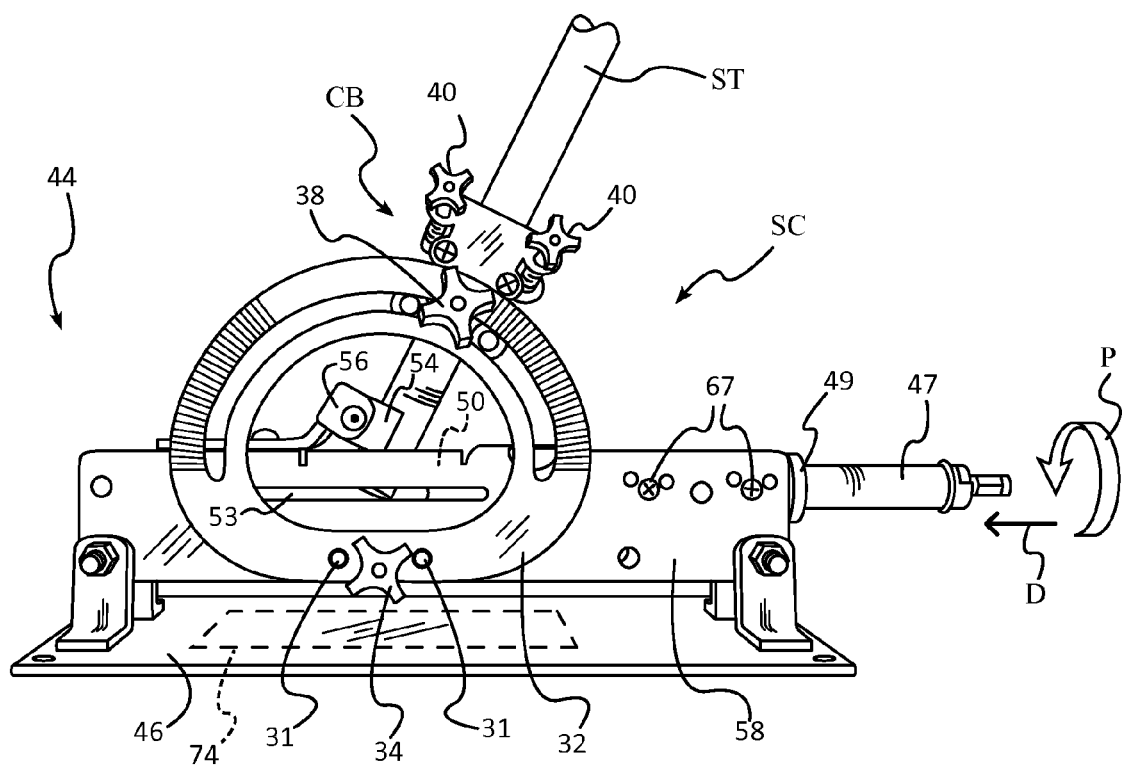

FIGS. 4A and 4B are a related pair of figures showing the set-up for making an accurate saddle cut in the secondary tube. Once the FIG. 3 process is completed with the secondary tube ST locked in place with clamping screws 40, the thumbscrews 34 are loosened on the carrier 14, and the Secondary tube Clamp assembly SC is then transferred to the saddle cutting fixture 44, and secured to guide retainer 52 retained in slots on the cutting fixture housing 58. FIG. 4A shows the saddle cutting fixture 44 disassembled with its component parts exploded out of housing 58 (see also FIG. 7A), comprising shaft 47 fitted for axial movement in a sleeve bearing 49 which in turn is retained in the spaced-apart vertical side walls of housing 58 by screws 67. A hole saw of the appropriate diameter matching the diameter of the primary tube PT is threaded on the interior end of shaft 47 (the left end as shown in FIG. 4A), while the exterior (right) end of the shaft terminates in a hex fitting for the chuck of a power drill (not shown). A centering pad 54 retained by pad retainer arm 56 is secured to the top horizontal surface of the housing 58 by screws 55. A lower slot 51 permits lateral adjustment of pins 31 of guide retainer 52 that is patterned after the carrier 14. An upper slot permits visual checking of the secondary tube, ST with reference to the centering pad assembly 54, 56 and the hole saw 48 when the Secondary tube Clamp assembly SC is fitted over the housing, as best seen in FIG. 4B.

FIG. 4B shows the housing 58 mounted on the legs of a base plate 46, which is large enough to permit bolting or clamping to a work bench. The Secondary tube Clamp assembly SC is slipped over and secured to the saw housing 58 by aligning holes 35 (see FIG. 1) with locating pins 31 of retainer 52, and tightening thumbscrews 34 in the center hole 43, best seen in FIG. 4A. The clamping screws 40 are then loosened to permit advancing the secondary tube ST, while still precisely angularly aligned by the Clamp Block locking knobs 38, downwardly through the top surface hole 50 of housing 58 so that its end is fully extended enough to be cut by the hole saw 47, 48. The hole 50 is an elongated opening to permit insertion of the secondary tube into the housing at acute angles without hindrance. Once the tube or rod is advanced sufficiently the clamping screws 40 are tightened. The semi-circular (in horizontal cross-section) centering pad is slid to the right to snugly engage the secondary tube, and the locking screws tightened. The secondary tube ST is now ready to be saddle cut by attaching the hole saw 48 onto the inner end of shaft 47. The other end of the shaft is then chucked in a hand drill or drill press. The hole saw is then rotationally powered as shown by Arrow P to cut the end of the secondary tube into a saddle shape by feeding the shaft horizontally into the housing as shown by Arrow D.

Figure 5A:
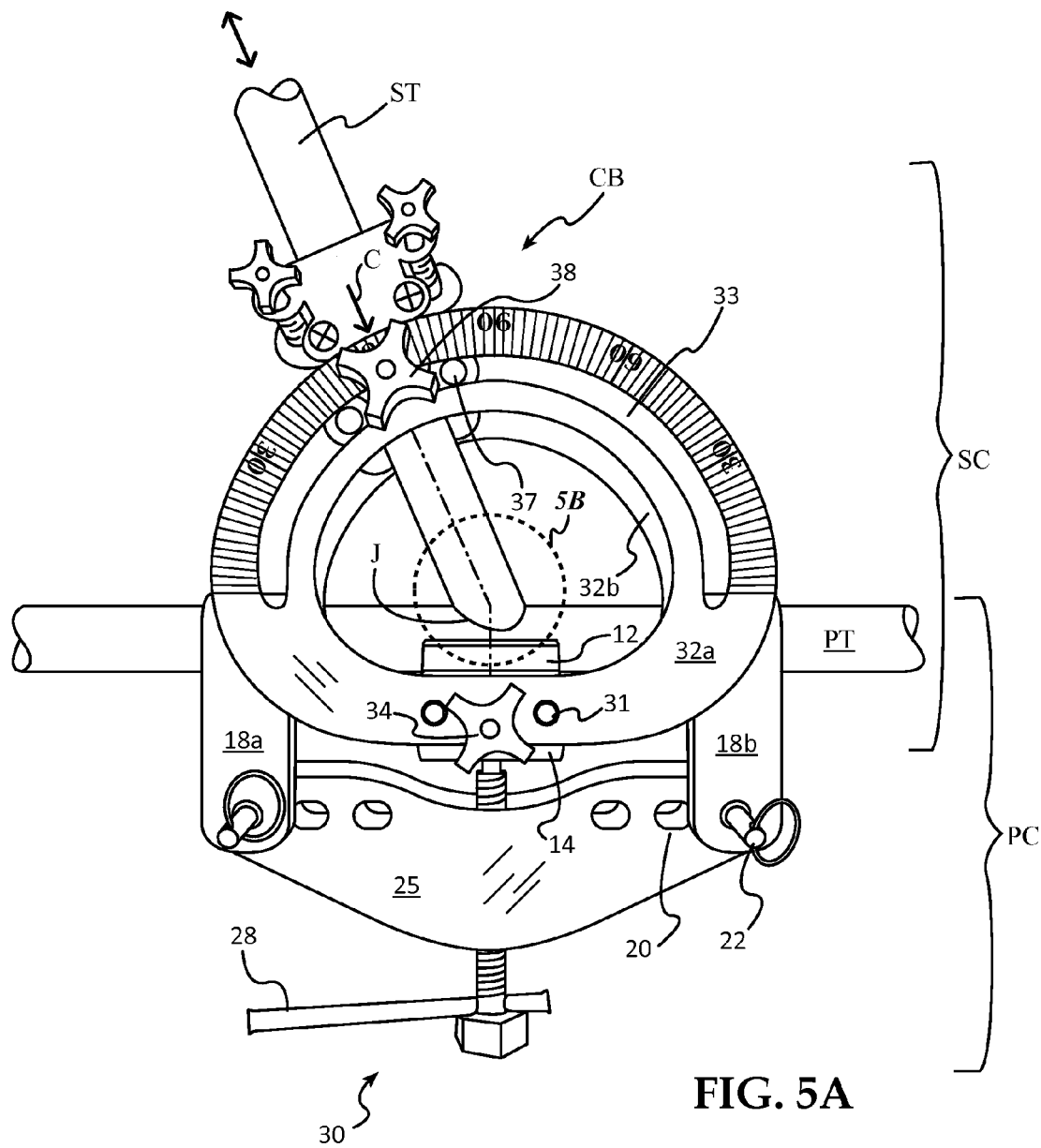
FIG. 5A is a side elevation of the secondary clamp re-mounted on the primary clamp, in which the secondary tube has been saddle cut and accurately positioned for a 60+° weld.
Figure 6A:
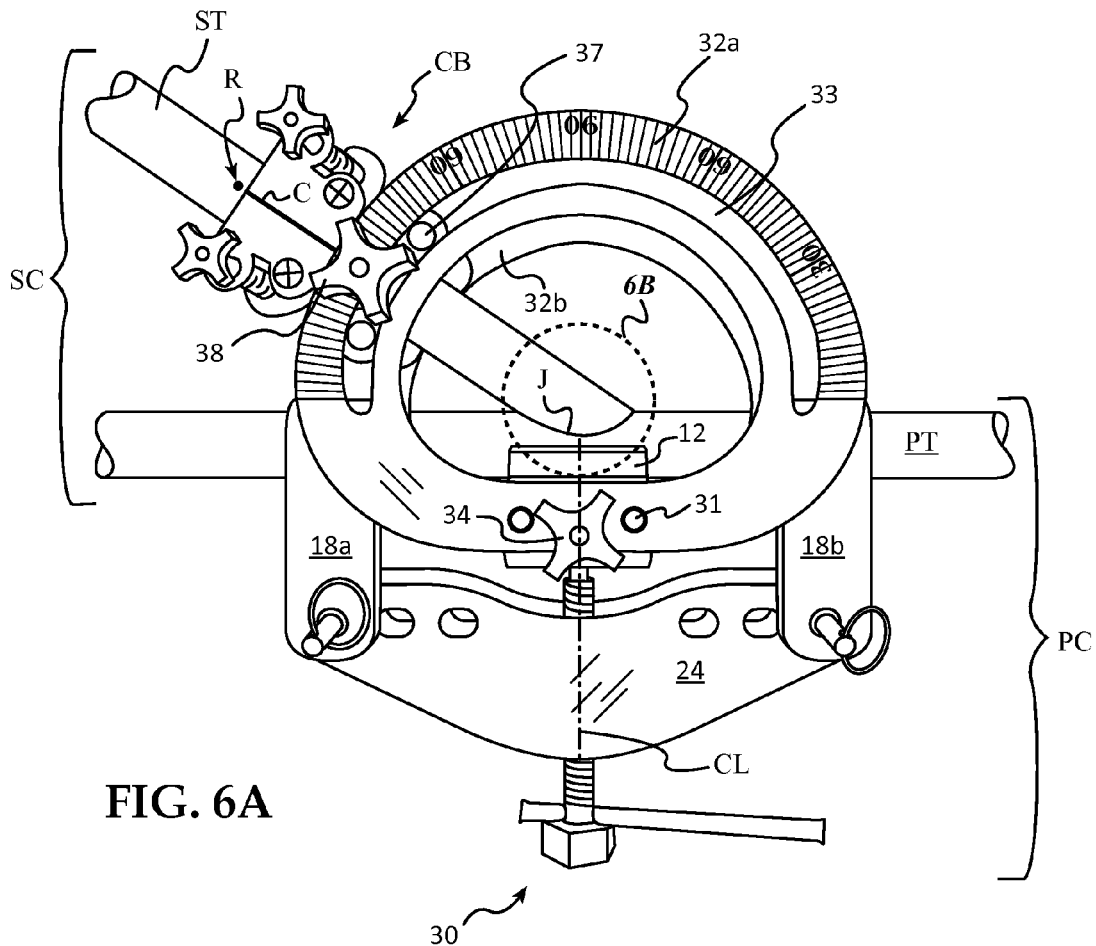
FIG. 6A is a side elevation of the secondary clamp assembly re-mounted to the primary clamp assembly with the secondary tube saddle cut and accurately positioned for a 35+° weld.

As shown in FIGS. 5A and 6A, when sawing is completed, the secondary clamp SC is removed from the cutting fixture 44 by releasing thumbscrews 34, the saddle cut end of the secondary tube ST is deburred, and the clamp assembly with cut tube is re-mounted onto the primary clamp fixture PC as shown. The secondary tube ST need not be withdrawn (by loosening clamping screws 40) since the exterior diameter of the hole saw is set to the same position in the saw housing 58 as the exterior diameter of the primary tube PT is when placed back in the primary clamp PC. In this way the saddle end cut will seat directly on the exterior surface of the primary tube with no further adjustment of SC. The hole 74 in base plate 46 (see FIG. 4B) permits extending the secondary tube ST through the hole so that the tube is cut medially, resulting in two shorter tubes having corresponding saddle cuts.

Figure 5B:
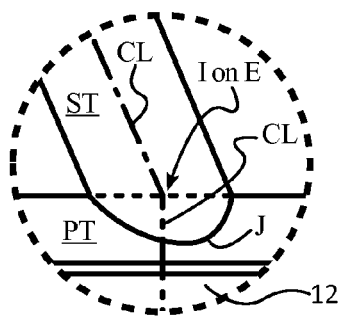
FIG. 5B is an enlargement of the intersection area 5B of FIG. 5A showing that the centerlines of the spindle and pad holding the primary tube and the secondary tube intersect at point I on the outer edge of the primary tube.
Figure 6B:
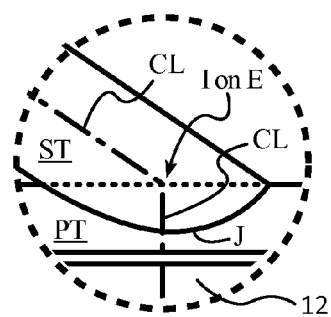
FIG. 6B is an enlargement of the intersection area 6B of FIG. 6A showing that the centerlines of the spindle and pad holding the primary tube and the secondary tube intersect at point I on the outer edge of the primary tube.

FIG. 5B is an enlargement of the intersection area 5B of FIG. 5A showing that the centerline CL of the spindle and pad holding the primary tube, PT, and the centerline CL of the secondary tube, ST, intersect at point I on the outer edge of the primary tube PT. Correspondingly, FIG. 6B is an enlargement of the intersection area 6B of FIG. 6A showing that the centerline CL of the spindle and pad holding the primary tube PT and the centerline CL of the secondary tube ST intersect at point I on the outer edge of the primary tube PT. As shown in FIGS. 5B and 6B the result of cutting using the hole saw in the fixture illustrated in FIGS. 4A, 4B, is a saddle cut contour J in the secondary tube ST that exactly matches the exterior wall surface of the primary tube PT. As seen in FIGS. 5A, 6A, the center line CL of the tube ST intersects the center line CL of the spindle 30 at the intersection point I on the surface E of the primary tube PT. The matching contour line J is the line of welding.

In FIGS. 5A, 5B, the acute included angle is 62° and in FIGS. 6A, 6B the acute included angle is 35°. Note the center line CL of the spindle bisects the weld line J so that there is an equal length and amount of weld on either side of that center line. Gradations may be marked on the exposed edge of the pressure pad 12 to confirm by measurement the equality of dimension (not shown). That means the pressure pad will exert uniform pressure opposite the join line to prevent warping as a result of weld and heat stresses. Accordingly it is evident that the Primary and Secondary Clamp assemblies PC/SC inter-engage to provide a highly precise work piece holding jig for welding.

It is recommended that a practice weld be done so that the straightness of the primary tube may be checked after welding. Should there be any curvature, or a wrong curve, the pressure of the pressure pad may be increased or decreased for subsequent welds. The angle of the handle 28 with respect to the frame plates 25 or the axis of the primary tube PT serves as a reference guide to how much pressure needs be applied. One of ordinary skill in the art will readily recognize that only minimal experience is necessary to permit obtaining a welded joint with, at worst, trivial distortion of either the primary or secondary tubes.

When moving the Secondary tube Clamp, SC, while a secondary tube ST is clamped therein, especially during deburring, or in transfers to and from the saddle cut fixture 44, the miter cut fixture 60, or the deck plate welding jig 85, it is important to not rotate the secondary tube around its center axis, particularly as its distal end may have an angle, bevel or saddle cut or bores for cross pins, so that the rotational angle orientation of the two end cuts to each other must be maintained. It is particularly helpful to make a reference mark, e.g., by a marking pen "dot", on the secondary tube aligned with the cursor C of the CB clamp retainers 41; see Reference Dot R in FIG. 6A.

Figure 7A:
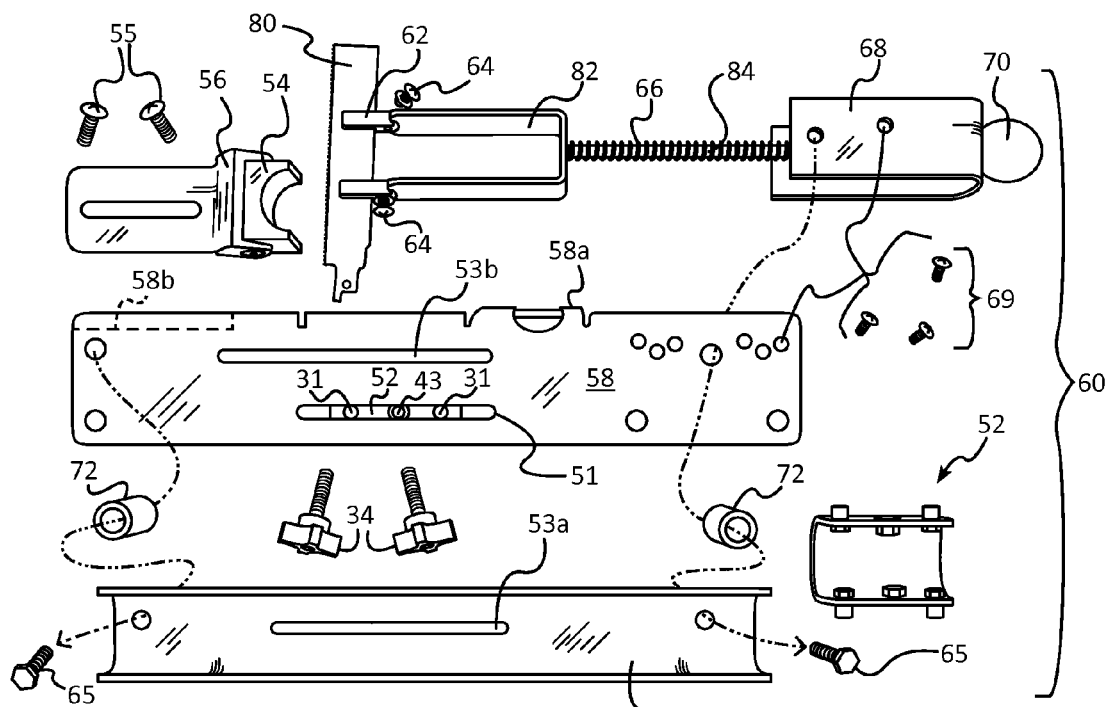
FIG. 7A is an exploded view of the un-assembled parts of a miter cutting fixture.
Figure 7B:
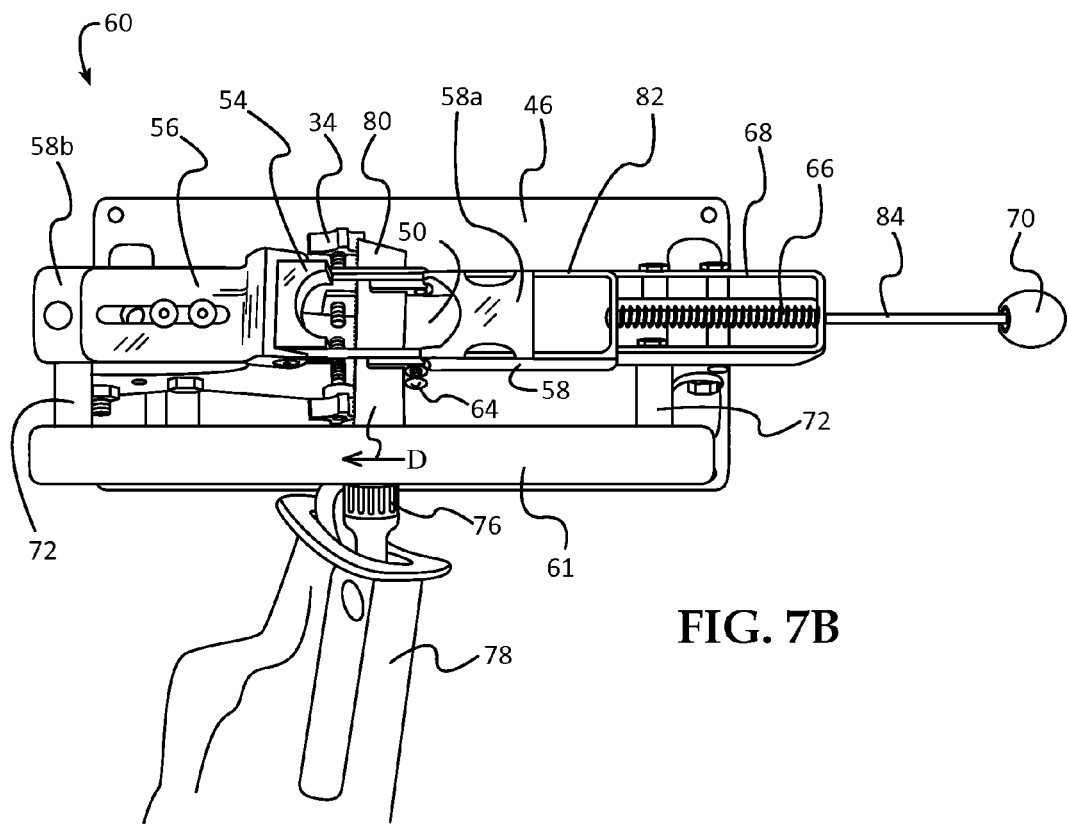
FIG. 7B is a top view of the miter cutting fixture of FIG. 7A, as assembled, showing a reciprocating saw inserted through the cutting slot and a spring biased blade pusher assembly for smooth, continuous sawing at the miter angle.

Miter Cutting Using Clamping System:

The Secondary tube Clamp SC is also used to set the secondary tube ST, and/or a primary tube PT to the desired angle for an end miter cut for angular joins, useful for angular tubing runs or for joins with a flat plate, e.g., deck, stair or wall plates. FIGS. 7A and 7B are a pair of figures showing the unassembled and assembled parts, respectively, of a miter cutting fixture 60 to which the Secondary tube Clamp assembly, SC, of the invention is fitted, see FIG. 8, for making an accurate miter cut in the secondary tube, ST.

The miter cutting fixture 60 uses the same housing 58 of the saddle cut fixture 44 (see FIGS. 4A and 4B) with the addition of an external shoe guide 61, comprising a U-channel, oriented with its open end horizontal, for receiving the guide shoe 76 of a reciprocating saw 78. The U-channel guide 61 is bolted to the housing 58 via bolts 65 and spacers 72 as shown by the dash-dot parts alignment lines.

Figure 8:
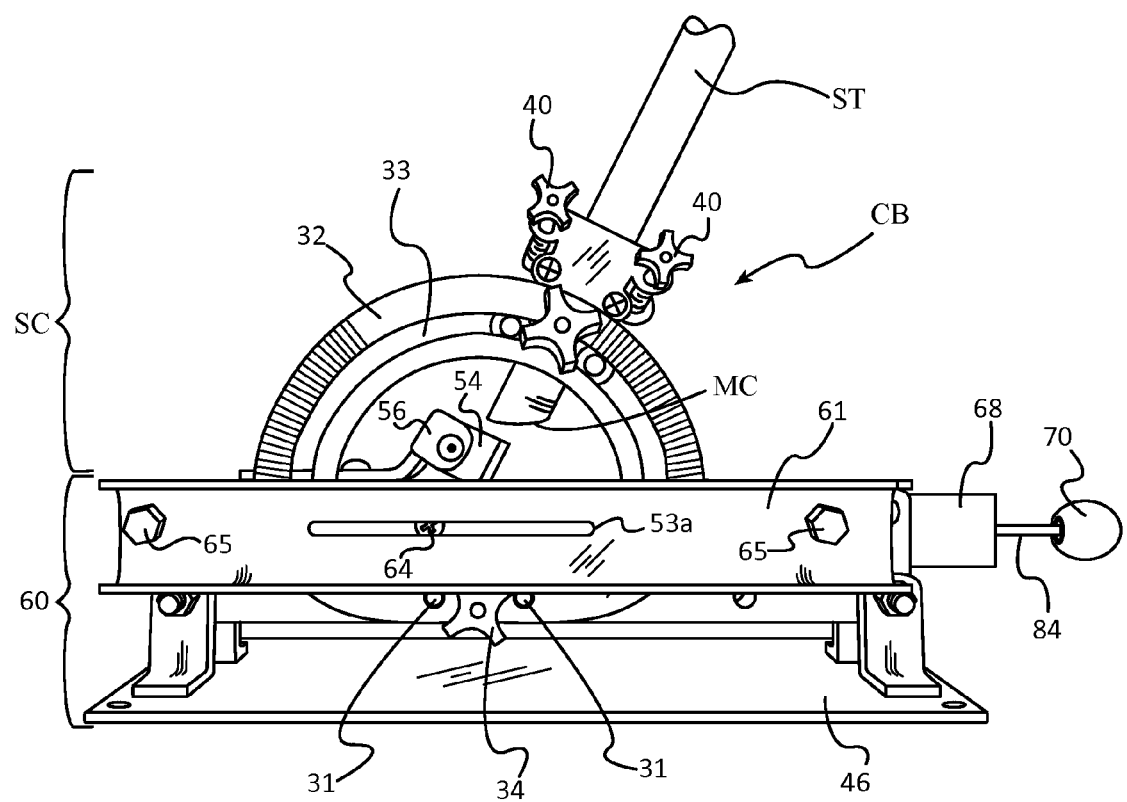
FIG. 8 is a side elevation of a the miter cutting fixture of FIGS. 7A and 7B showing the secondary clamp mounted between two outer guide brackets, and the secondary tube already having been cut by a reciprocating saw inserted in the opposed aligned blade guide slot(s) in the guide bracket(s)

Once the FIG. 3 secondary tube angle setting process is completed with the secondary tube ST locked in place in the Secondary tube Clamp SC with clamping screws 40, the thumbscrews 34 are loosened on the carrier 14, and the secondary clamping assembly SC is then transferred (referring now to FIGS. 7B and 8) to the housing 58 of the miter cutting fixture 60, and secured to guide retainer 52 (which is substantially the same as the carrier 14). The guide pins 31 of retainer 52 are slidingly received and retained in slots 51 of the miter cutting fixture housing 58. The miter saw guide assembly comprises a mounting bracket 68, U-shaped in top view, which is secured between the side walls of the housing 58, by bolt 65 in the left-most hole and screws 69, as shown in FIGS. 7A and 7B. One of the screws 69 secures the bracket 68 to the side wall of the housing 58 facing the viewer, and the remaining two screws 69 secure the opposite arm of the bracket 68 to the opposite housing side wall. A yoke 82 having a pair of blade guides 62 secured to the arms thereof by screws 64 is biased in the cutting direction (by the operator guiding the saw to the left in these figures) by spring 66 threaded onto the yoke shaft 84. The screws 64 have shanks long enough to fit through slot 53*b* of the walls of the housing 58. An outer end stop for the shaft 84 is provided by knob 70. As shown, the saw blade 80 of the reciprocating saw 78 is maintained in a horizontally level position during sawing, and the guide screw 64, riding in the slot 53 causes a precise straight miter cut to the end of the secondary tube, ST, as shown in FIG. 8. As with the saddle cutting fixture, the centering pad 54 cradles the back side of the secondary tube while being sawed, and is adjustably fixed in place by the pad retainer 56 secured to the top web 58*b* of the housing 58.

As can be seen in FIGS. 7A and 7B, the housing 58 is generally an inverted U-shape, and has two top surface webs 58*a* (on the right) and 58*b* on the left, with a hole 50 between them to insert the secondary tube ST for sawing. Optionally, corresponding bottom wall webs may be provided (not shown). As before, the housing 58 is supported on and bolted to the legs of the baseplate 46.

FIG. 7B shows the miter cutting fixture 60 assembled from the parts shown in FIG. 7A, but the secondary clamping assembly SC has not yet been secured to the saw housing 58. FIGS. 7B and 8 show the mitering fixture 60 secured to the base plate 46 and the secondary clamping assembly now secured to the fixture housing by aligning holes 35 (see FIG. 1) with locating pins 31 and tightening thumbscrews 34. Clamping screws 40 are loosened enough to permit sliding the secondary tube ST in the Clamp Block CB down into the miter saw fixture 60 far enough to be end-cut. The secondary tube ST is advanced so that its end is fully received within the hole 50, and then the clamping screws 40 tightened. The secondary tube is now ready to be miter cut by pulling knob 70 to retract the yoke 82 with its blade guides 62. As seen in FIG. 7B, the saw blade 80 is attached to the reciprocating saw 78 and inserted through the slot 53*a* in the shoe guide 61 and then through the aligned slot 53*b* in the saw housing side wall 58, and into the blade guides 62. The reciprocating saw shoe 76 is fully nested within the top and bottom flanges of the shoe guide 61. The reciprocating saw is then powered to cut the secondary tube by laterally moving the saw (leftward in FIG. 7B). The cutting force is applied by the operator to the reciprocating saw. Note that the blade guides 62 are spring loaded to guide and follow the blade as it is advanced thereby keeping the saw blade centered in the saw housing slot to prevent the saw teeth cutting the housing and to make a precise, straight cut. Optionally, the saw 78 can be supported at its outboard end and power-advanced for cutting the tube. As best seen in FIG. 8, the secondary tube ST is shown as partially withdrawn to show the miter cut end MC.

Once miter sawing in mitering fixture of FIGS. 7A, 7B and 8 is completed, the secondary clamp SC is removed from the mitering fixture 60, the miter cut end of the secondary tube ST is deburred and the clamp assembly with cut tube is remounted onto the primary clamp fixture PC as shown in FIG. 3 for an angle join. In that situation, the primary tube, PT is not continuous between both yokes 18*a* and 18*b*, but rather, the suitably miter cut end of PT (not shown) is advanced to meet the miter cut end of ST and the two welded together.

Figure 9A:
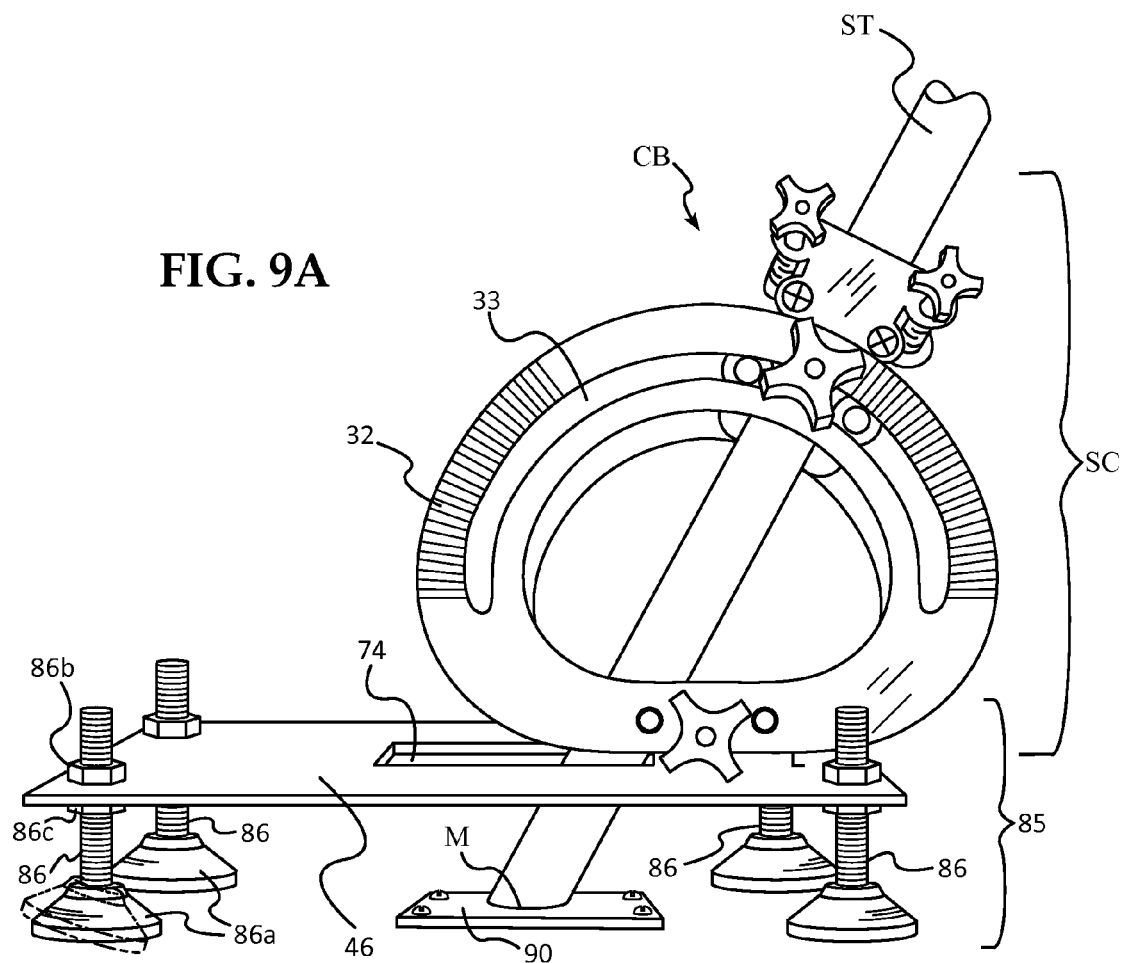
FIG. 9A is an isometric of a deck positioning fixture for welding mitered secondary tubes to a deck or other flat plate over which the fixture is positioned with the secondary tube held at a precise angle by the secondary clamp assembly.

Alternately, as seen in FIG. 9A, the secondary clamp SC is secured to set-up base 46 of welding fixture 85. The base plate 46 in this embodiment has an aperture 74 large enough to permit the miter cut secondary tube, ST to pass there through so that the mitered end, M, engages a wall, floor, stair or deck plate 90 over which the base plate is properly positioned. The base plate 46 optionally includes feet 86 which are vertically adjustable by means of upper and lower nuts 86*b*, 86*c*, respectively. The vertical spacing, typically 4-6", provides clearance for welding the mitered end M of the tube ST or PT to the plate 90. Note, as shown in phantom on the front left foot 86, each foot terminates in a swivel pad 86*a* that permits leveling or canting the plate as needed for the precise positioning of the tube ST with respect to the plate 90, for example on a canted deck. The secondary tube may be tack-welded, the Secondary Clamp SC and welding fixture 85, removed, and the finish welding completed.

Figure 9B:
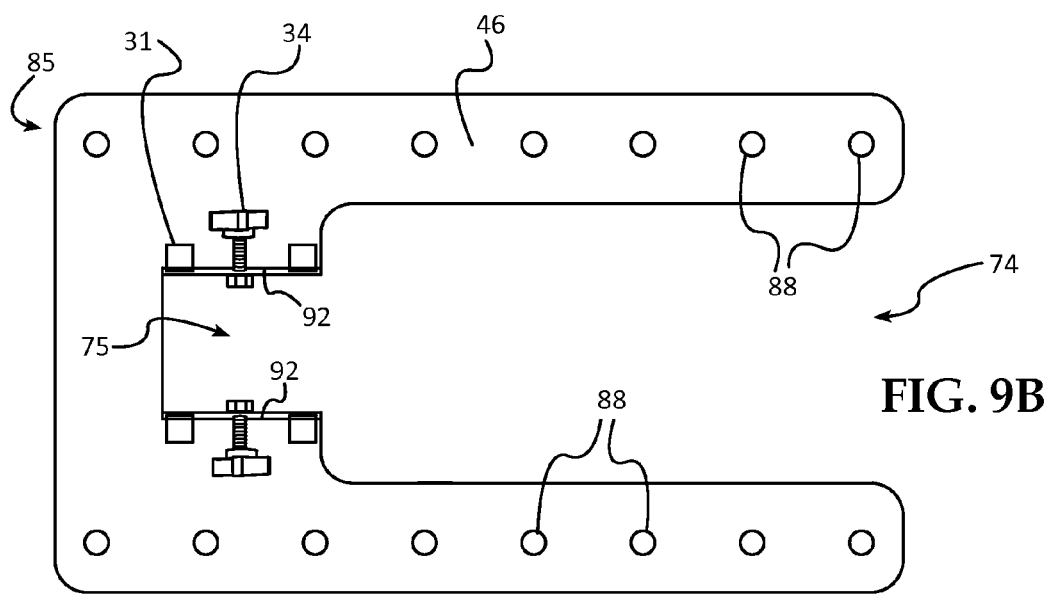
FIG. 9B is a plan view of a second embodiment of the welding jig of FIG. 9A showing a cut-out access aperture permitting the jig to be slipped in place laterally and providing expanded access for welding.

As shown in FIG. 9B, the base plate 46 of the welding fixture 85 may have a wide range of configurations, such as tube opening 74 being C-shaped in plan view, to permit positioning around and easy removal from a secondary tube, ST as welded to a deck plate 90, particularly needed where the upper end of the secondary tube is already connected to some other component, such as a stair or deck rail. Note the retainer pins 31 for the Secondary tube Clamp, SC are welded to upturned flanges 92 formed from the base plate 46, providing additional clearance pass-through 75 for a tube to be welded, ST or PT as the case may be. A welded nut and hole receives the shank of the thumbscrew 34, or a threaded stud may be used. A plurality of holes 88 adjacent the peripheral sides of the base plate 46 permit selective location of the threaded shanks of the feet 86, as needed for a particular welding set-up.

In another embodiment, one skilled in the art can appreciate that it is straight-forward to provide alignment pins 31 and threaded nut or stud to receive the thumbscrew 34 on a standard belt sander tube notching unit, so that the Secondary Clamp assembly SC may be removably secured to it to make either miter or saddle cuts.

Accordingly, the principles of the invention include applying pressure to a first tube or rod opposite a join line at a locus of welding; providing a means for attachment of the SC to the PC and to the several fixtures disclosed: saddle cutting, miter cutting, planar surface welding, and tube or rod-to-tube or rod welding; providing a means for engaging the SC in each of the several fixtures disclosed to which the SC is transferred or re-transferred (recited just above); locating the spindle medially between the spaced, adjustable, aligned sling assemblies which cradle a first tube or rod to which a second tube or rod is to be welded; providing spaced, aligned guide plates, each having an arcuate slot having a radius whose center is located at the intersection I with the spindle center line at the surface of the first tube or rod retained in the sling assemblies; adapting the clamp block assembly to slide in the arcuate slots of the guide plates for angularly positioning a second tube with respect to a first tube at the intersection I; adapting the means for attachment and means for engaging to securely retain the guide plates during the selective angular positioning of the second tube or rod with respect to the first; adapting the SC to be transferred and re-transferred and from the several fixtures without disturbing the angular position of the second tube or rod; fixedly retaining a tube or rod at a selected angle to be cut, either saddle cut or miter cut, during the cutting process, the cuts being made at the proper angle corresponding to the intersection with the tube, rod or planar surface to which the cut tube or rod is to be welded, the "planar surface" including the oblique end of a tube that has been miter cut; miter cutting two tubes at corresponding angles to permit welding to each other to provide an angular join; saddle cutting at the proper angle corresponding to the intersection of two tubes or rods joined at an angle of 90° or less (orthogonal to acute angles); disposing the clamps relative to each other by means of the respective attachment and engagement means so that a center line of the (second) tube or rod whose angular position has been selectively set intersects a first tube or rod centrally of a welding locus; aligning a center line of application of pressure on a first tube or rod by a first clamp with an angular center line of a second tube or rod so that the center lines intersect at a point I on the exterior surface of said first tube or rod, said point I being substantially central of a weld join line; orienting the center line of tubular cutting parallel to a zero angle line of the angularly adjustable clamp SC, and to intersect the central axis of a tube or rod being cut; orienting the center point of the radius of curvature of the arcuate slots on the zero angle line of the guide plates; and orienting the plane of cut of a miter cutting saw parallel to a zero angle line of the clamp SC.

INDUSTRIAL APPLICABILITY

It is clear that the inventive clamp and sawing fixture of this application has wide applicability to the metal fabrication industry, namely to precision welding fabrication of stainless steel marine railings, racks, stair rails, ladders, and the like. The inventive system clearly permits greater precision in set-up of work pieces, including entire railing assemblies using a plurality of the primary and secondary clamp assemblies, and for division of labor between professional welders and set-up men. The several fixture options of the inventive system, including saddle cutting, miter cutting and welding fixtures make this system both universal and complete. Thus, the inventive system has the clear potential of becoming adopted as the new standard for apparatus and methods of tubular cutting and welding.

It should be understood that various modifications within the scope of this invention can be made by one of ordinary skill in the art without departing from the spirit thereof and without undue experimentation. For example, the pressure pads can have a wide range of designs to provide the functionalities disclosed herein. Likewise the saddle cutting and miter cutting fixture bases may be easily adapted for drill presses, or modified for field use. This invention is therefore to be defined by the scope of the appended claims as broadly as the prior art will permit, and in view of the specification if need be, including a full range of current and future equivalents thereof.

Parts List (This Parts List is provided as an aid to Examination and may be canceled upon allowance)

| | |
|---|---|
| 10 | Inventive fixture system |
| 12 | Pressure pad |
| 13 | Semi-circular bottom face |
| 14 | Carrier |
| 15 | Cup-pad for Spindle end |
| 16 | Retaining Screw |
| 18 | Sling |
| 20 | Holes in yoke |
| 21 | Notch |
| 22 | Pin |
| 24 | Frame assembly |
| 25 | Frame plates |
| 26 | Hex-head end of spindle 30 |
| 28 | Spindle handle |
| 29 | Threaded bridge piece |
| 30 | Spindle |
| 31 | Pins on Carrier 14 |
| 32 | Guide plate assembly |
| 33 | Slot |
| 34 | Thumbscrew |
| 35 | Screw |
| 36 | Halves of split clamp |
| 37 | Pins in CB |
| 38 | Locking knobs |
| 38a | shank or threaded stud |
| 39 | Recessed plate in carrier 14 for spindle cup pad |
| 40 | Clamping screw |
| 41 | Clamp retainer |
| 42 | Spring |
| 43 | Hole for thumbscrew |
| 44 | Saddle cutting fixture |
| 46 | Saw fixture base |
| 47 | Shaft |
| 48 | Hole saw |
| 49 | Bearing housing |
| 50 | Hole in housing |
| 51 | Guide slot |
| 52 | Guide retainer |
| 53a 53b | Saw Slot |
| 54 | Centering Pad |
| 55 | Locking Screw |
| 56 | Pad retainer arm |
| 58 | Saddle cut assy. housing |
| 60 | Miter cutting fixture |
| 61 | Shoe Guide |
| 62 | Blade guide |
| 64 | Retaining screw |
| 65 | Retaining bolts |
| 66 | Spring |
| 67 | Retaining screw |
| 68 | Mounting bracket |
| 69 | retaining screws (3) |
| 70 | Knob |
| 72 | Spacers |
| 74 | Hole in base 46 |
| 75 | Tube hole |
| 76 | Saw shoe |
| 78 | Reciprocating saw |
| 80 | Saw blade |
| 82 | Yoke |
| 84 | Yoke shaft |
| 85 | Welding fixture |
| 86 | Adjustable legs |
| 86a | Swivel foot pads, |
| 86b, c | nuts |
| 88 | Holes for legs |
| 90 | Exemplary deck, stair or wall plate |
| 92 | Flanges in base plate 46 for SC |
| D | Saw Cutting Direction |
| CB | Clamp Block assembly |
| ST | Secondary tube, ST |
| PT | Primary Tube, PT |
| P | Rotary Power |
| PC | Primary Clamping assy |
| SC | Secondary Clamping assy |
| I | Intersection point of CLs on Edge, E, of Primary Tube |
| E | Edge of PT |

-continued

Parts List (This Parts List is provided as an aid to Examination and may be canceled upon allowance)

| | |
|---|---|
| CL | Center line of Tubes or Spindle and Carrier |
| J | Join (weld) line |
| S | Slot in Carrier 14 |
| C | Cursor |
| R | Reference Dot on ST |

The invention claimed is:

1. A metal tube and rod weld stress compensation system comprising:
   a) a primary metal tube or rod clamp assembly having means for retaining a primary metal tube or rod at spaced positions along the length of said tube or rod, said primary metal tube or rod clamp assembly including an adjustable pressure pad disposed to apply weld stress compensating pressure to the surface of said primary metal tube or rod opposite a locus of welding, said pressure pad is configured to apply said weld stress compensating pressure to said surface of said tube or rod along a length corresponding to a length along said tube or rod of said locus of welding, and said pressure pad is configured to permit weld-ing access to the entire locus of welding;
   b) a secondary metal tube or rod clamp assembly having means for selectively, angularly and fixedly positioning said secondary tube relative to said primary tube for intersection along a join line at said locus of welding and means for attachment to said primary clamp assembly in a precise fixed position for said intersection without disturbing said angular position of said secondary metal tube or rod, and without blocking said access to said locus of welding;
   c) said primary clamp assembly includes means for engaging the secondary clamp assembly attachment means without disturbing the angular position of the secondary metal tube or rod, and without blocking said access to said locus of welding; and
   d) said pressure pad, upon adjustment, reducing warping of said primary metal tube or rod as a result of welding stresses generated when said primary and secondary metal tubes or rods are welded together at said intersecting join line, by applying a weld stress compensation pressure onto said primary tube or rod surface opposite said locus of welding.

2. A weld stress compensation system as in claim 1 wherein said primary clamping assembly includes a frame assembly having a spindle for applying pressure to said pressure pad, said spindle being located medially between spaced, adjustable, aligned sling assemblies which cradle and retain said primary metal tube or rod at said spaced positions.

3. A weld stress compensation system as in claim 2 wherein said primary clamp assembly includes a carrier assembly pivotally mounted to said spindle, said carrier retains said pressure pad, and said carrier includes said means for engaging said secondary clamp assembly.

4. A weld stress compensation system as in claim 3 which includes means for removably securing said secondary clamp assembly to said primary clamp assembly with both tubes or rods maintained in a preselected angular position with respect to each other for welding at said intersecting join line.

5. A weld stress compensation system as in claim 1 wherein said secondary clamp assembly includes a pair of spaced, aligned guide plates, each having an arcuate slot having a radius whose center is located at said intersection, said secondary clamp assembly including a split clamp block assembly for engaging said secondary tube or rod, said split clamp block assembly being adapted to slide in said aligned arcuate slots for angularly positioning said secondary tube or rod with respect to said primary tube at said intersection.

6. A weld stress compensation system as in claim 5 wherein said split clamp block assembly includes spring biased clamping screws for selective application of gripping pressure to said secondary tube or rod to permit sliding adjustment of said secondary tube or rod toward or away from said intersection.

7. A weld stress compensation system as in claim 6 wherein said split clamp block assembly includes clamp block retainer plates having pins slidably fitting said arcuate slots of said guide plates to permit said arcuate movement, and a locking means to lock said split clamp block assembly at a selected angle with respect to said primary tube.

8. A weld stress compensation system as in claim 7 wherein each of said guide plates includes said attachment means adapted to be securely retained by said primary clamp engaging means in said selected angular position during selective angular positioning of said secondary tube or rod and during welding of said secondary tube or rod to said primary tube or rod.

9. A weld stress compensation system as in claim 8 which includes a saddle-cut fixture assembly to which said secondary clamp assembly may be transferred and secured via said attachment means of said guide plates while fixedly retaining said secondary tube or rod at a selected angle for a saddle cut at the proper angle corresponding to said intersection, and wherein the resulting saddle cut in said secondary tube or rod matingly engages the primary tube or rod at the join intersection for welding, upon said secondary clamp assembly being re-transferred and re-secured to said primary clamp assembly via said attachment means after said saddle cutting.

10. A weld stress compensation system as in claim 8 which includes a miter cut fixture assembly to which said secondary clamp assembly may be secured via said attachment means of said guide plates while permitting angular adjustment of said secondary tube or rod for a selected miter cut angle, and for fixedly retaining said secondary tube or rod at said selected miter cut angle during miter cutting, said miter cutting of said secondary tube or rod permitting welding of said secondary tube or rod to a planar surface selected from a flat plate or a second tube or rod that has been miter cut at a corresponding miter angle.

11. A weld stress compensation system as in claim 10 which includes a welding fixture for angularly positioning an end of a miter cut tube or rod for welding to a generally planar surface member, comprising a base plate including means for engaging said secondary clamp assembly via said attachment means of said guide plates without disturbing the angular position of the secondary tube or rod.

12. A weld stress compensations system as in claim 11 wherein said welding fixture base plate is generally planar and includes a plurality of vertically adjustable legs and a cut-out portion permitting said secondary tube or rod to extend through the plane of said base plate and permitting said base plate to be removed laterally from said secondary tube or rod after welding to said planar surface member without disturbing said welded secondary tube or rod.

13. A tube or rod clamp assembly for transfer of a tube or rod in a selected fixed angular position between saddle and miter cutting fixtures, and tube or rod-to-tube or rod, or tube or rod to flat plate welding fixtures, comprising in operative combination:

a) a tube or rod clamp assembly having means for selectively, angularly and fixedly positioning a first tube relative to a second tube or relative to a flat plate, for intersection along a saddle or straight miter join line at a locus of cutting or welding;

b) said clamp assembly includes means for attachment of said clamp assembly to a cutting or welding fixture in a precise angular position for intersection with a second tube or rod, or with a flat plate, without disturbing said angular position of said first tube or rod; and c) said clamp assembly includes a pair of spaced, aligned guide plates, each having an arcuate slot having a radius whose center is located at said intersection, said clamp assembly including a split clamp block assembly for engaging said first tube or rod, said split clamp block assembly being adapted to slide in said aligned arcuate slots for angularly positioning said first tube or rod with respect to said locus of cutting or welding at said intersection.

14. A tube or rod clamp assembly as in claim 13 wherein said attachment means is configured to matingly engage at least one of:

a) a second tube or rod clamp assembly having means for applying pressure to a second tube or rod secured therein opposite a locus of welding;

b) a saddle-cut fixture assembly for cutting the end of said first tube or rod into a saddle cut of the proper angle to permit welding along a locus of join with a second tube or rod;

c) a miter cut fixture assembly for cutting said tube or rod at a selected miter angle to mate to a planar surface selected from a flat plate member or a second tube or rod that has been miter cut at a corresponding miter angle; and d) a welding fixture assembly for positioning said first tube or rod at said selected miter angle into contact with a generally flat plate member for welding along a miter cut end of said first tube or rod.

\* \* \* \* \*